United States Patent
Hanna et al.

(10) Patent No.: US 10,391,503 B2
(45) Date of Patent: Aug. 27, 2019

(54) SYSTEM AND METHOD FOR PREDICTING WIND DIRECTION AND SPEED TO BETTER CONTROL DRIFT

(71) Applicants: IOWA STATE UNIVERSITY RESEARCH FOUNDATION, INC., Ames, IA (US); AGCO CORPORATION, Duluth, GA (US)

(72) Inventors: H. Mark Hanna, Ames, IA (US); Matthew Schramm, Ames, IA (US); John Peterson, Duluth, GA (US); Jeffrey Michael Zimmerman, Duluth, GA (US)

(73) Assignees: Iowa State University Research Foundation, Inc., Ames, IA (US); AGCO Corporation, Duluth, GA (US)

( * ) Notice: Subject to any disclaimer, the term of this patent is extended or adjusted under 35 U.S.C. 154(b) by 344 days.

(21) Appl. No.: 15/246,877

(22) Filed: Aug. 25, 2016

(65) Prior Publication Data
US 2018/0054983 A1    Mar. 1, 2018

(51) Int. Cl.
| | | |
|---|---|---|
| B05B 1/20 | (2006.01) | |
| G05B 19/042 | (2006.01) | |
| A01M 7/00 | (2006.01) | |
| A01C 23/04 | (2006.01) | |
| A01C 23/00 | (2006.01) | |

(52) U.S. Cl.
CPC ............ *B05B 1/20* (2013.01); *A01M 7/0014* (2013.01); *A01M 7/0042* (2013.01); *G05B 19/042* (2013.01); *A01C 23/007* (2013.01); *A01C 23/047* (2013.01)

(58) Field of Classification Search
CPC .. A01M 7/0042; A01M 7/0014; A01C 23/047
See application file for complete search history.

(56) References Cited

U.S. PATENT DOCUMENTS

| 6,424,295 B1 * | 7/2002 | Lange ................. A01C 23/007 |
| | | 342/26 R |
| 9,867,329 B2 * | 1/2018 | Wendte ................. A01C 15/04 |
| 2009/0099737 A1 * | 4/2009 | Wendte ............... A01B 79/005 |
| | | 701/50 |

(Continued)

*Primary Examiner* — Amar Movva
(74) *Attorney, Agent, or Firm* — Hovey Williams LLP (57) ABSTRACT

A system and method for predicting a future wind direction and speed and, based thereon, determining a future wind-driven drift and providing the information to an operator or automatically acting to adapt application parameters to better control the wind-driven drift of a fluid during application of (56) References Cited

U.S. PATENT DOCUMENTS

2009/0114210 A1\* 5/2009 Guice ................... A01M 21/04
    126/569
2016/0368011 A1\* 12/2016 Feldhaus ................. B05B 12/12
2017/0016430 A1\* 1/2017 Swaminathan ......... F03D 17/00

\* cited by examiner

SYSTEM AND METHOD FOR PREDICTING WIND DIRECTION AND SPEED TO BETTER CONTROL DRIFT

FIELD

The present invention relates to systems and methods for controlling wind-driven drift during the application of fluids by agricultural sprayer machines, and more particularly, to a system and computer-implemented method for predicting future wind direction and speed in the immediate vicinity of an agricultural sprayer machine so as to allow for proactively adapting application parameters to better control wind-driven drift.

BACKGROUND

Agricultural sprayers are used to deliver fluid treatments that protect and improve crop plant health. "Drift" occurs when small droplets of these fluids are driven by the wind beyond their proper placement. Drift can result in crops within a target area receiving too little or too much treatment, and can result in undesirable effects on non-target organisms and on air and water quality outside of the target area. The U.S. Environmental Protection Agency has promulgated regulations for controlling drift into sensitive areas.

Several mathematical models have been used to determine and adjust for the propagation of drift, including Lagrangian, Gaussian diffusion, plume, regression, random walk, and computational fluid dynamic models. These models have varying degrees of accuracy based on differing assumptions and differing abilities to measure or estimate relevant parameters. For example, regression models exhibit poor performance when current conditions are substantially different from the conditions on which the models were built, and attempts to incorporate random fluctuations have not sufficiently enhanced performance; plume models exhibit poor performance at short distances; and computational fluid dynamic models are computationally intensive unless simplified at the expense of increased errors.

One solution for addressing drift has been to attach wind sensors to the ends of sprayer booms to detect current wind direction and speed and then use one of these models to control nozzle parameters to alter droplet size to reactively control drift. However, these models all rely on current wind conditions and are therefore slow to adapt to rapid changes in wind direction and speed. In particular, if the wind changes speed or direction soon after a droplet has left the nozzle, then undesirable drift can still occur with these prior art solutions.

This background discussion is intended to provide information related to the present invention which is not necessarily prior art.

SUMMARY

Embodiments of the present invention solve the above-described and other problems and limitations by providing a system and computer-implemented method for predicting future wind direction and speed and, based thereon, determining future wind-driven drift to facilitate better control over the wind-driven drift of a fluid during application of the fluid to land or crops by an agricultural machine.

Embodiments of the present invention may be used with substantially any agricultural sprayer machine. Such an agricultural machine may broadly include a tank or other reservoir, a pump, a pressure plumbing, a plurality of delivery lines, a plurality of nozzles, one or more machine sensors, and one or more meteorological sensors. The tank may contain the fluid, and the pump may transfer the fluid out of the tank. The pressure plumbing may receive the fluid via the pump under a fluid pressure, and the delivery lines arranged along a boom of the agricultural machine may receive and distribute the fluid from the pressure plumbing. The nozzles may be connected to the plurality of delivery lines, and may meter, atomize, and deliver the fluid to a target area. The machine sensors may provide machine data about one or more application parameters including fluid pressure data, and the meteorological sensors may provide meteorological data including current wind direction data and current wind speed data.

In a first embodiment of the present invention, a control system is provided for facilitating controlling a wind-driven drift of a fluid during an application of a fluid by an agricultural machine. The control system may broadly comprise a drift distance determination mechanism, a processor, and an operator display. The drift distance determination mechanism may determine a plurality of drift distances correlated with a plurality of different application parameters. The processor may receive the machine data and the meteorological data, use a mathematical model to predict a future wind direction and a future wind speed for at least a next approximately between 5 seconds and 30 seconds, access the drift distance determination mechanism, and based thereon, determine a future wind-driven drift of the fluid. The operator display may show the determined future wind-driven drift of the fluid to facilitate proactively controlling it.

In a second embodiment of the present invention, a control system is provided for automatically controlling a wind-driven drift of a fluid during an application of a fluid by an agricultural machine. The system may broadly comprise a drift distance database and a processor. The drift distance database may contain a plurality of drift distances correlated with a plurality of different application parameters. The processor may receive the machine data and the meteorological data, use a mathematical model to predict a future wind direction and a future wind speed for at least a next approximately between 5 seconds and 30 seconds, access the drift distance database, and based thereon, determine a future wind-driven drift of the fluid. Based on the determined drift, the processor may automatically adapt the one or more application parameters to proactively automatically control it.

In a third embodiment of the present invention, a computer-implemented method is provided for improving the functionality of a computer on an agricultural machine for facilitating controlling a wind-driven drift of a fluid during an application of the fluid by the agricultural machine. The computer-implemented method may broadly comprise the following actions. An electronic processor may receive machine data from one or more machine sensors configured to provide machine data about one or more application parameters including a fluid pressure data. The processor may receive meteorological data from one or more meteorological sensors configured to provide meteorological data including a current wind direction and a current wind speed. The processor may use a mathematical model to predict a future wind direction and a future wind speed near the agricultural machine for at least a next approximately between 5 seconds and 30 seconds. The processor may access a drift distance database containing a plurality of drift distances correlated with a plurality of different application parameters. The processor may determine a future wind-driven drift of the fluid based on the machine data, the predicted future wind direction and the predicted future wind speed, and the correlated drift distances in the drift distance database.

Various implementations of some or all of the foregoing embodiments may include any one or more of the following additional features. The one or more application parameters may further include a ground speed of the agricultural machine, a boom height of the boom, a boom width of the boom, and/or a droplet size of the fluid delivered by the plurality of nozzles. The meteorological data may further include relative humidity data and/or temperature data. The processor may collect the current wind direction data and the current wind speed data for the next approximately between 5 seconds and 30 seconds, or for the next between approximately 5 seconds and 60 seconds. The processor may predict a range of future wind directions, and the operator display may show the range of future wind directions as an arc centered on the agricultural machine. The processor may predict a range of future wind directions for each of two or more droplet sizes of the fluid delivered by the plurality of nozzles, and the operator display may show a particular range of future wind directions for each of the two or more droplet sizes as a differently colored arc centered on the agricultural machine. The mathematical model used to predict the future wind direction and the future wind speed may be a kernel filter, an autoregressive model, an autoregressive integrated moving average model, or a hybrid model which incorporates features of two or more different mathematical models. The system may further include a sensitive area database containing information about one or more sensitive areas bordering the target area, and the operator display may show a nearby sensitive area along with the determined future wind-driven drift of the fluid in order to facilitate proactively controlling the wind-driven drift of the fluid to avoid the nearby sensitive area. The processor may automatically adapt the one or more application parameters to proactively automatically control the wind-driven drift of the fluid.

This summary is not intended to identify essential features of the present invention, and is not intended to be used to limit the scope of the claims. These and other aspects of the present invention are described below in greater detail.

DRAWINGS

Embodiments of the present invention are described in detail below with reference to the attached drawing figures, wherein:

FIG. 1 is an isometric view of an agricultural machine for applying a fluid to land and/or crops;

FIG. 2 is a plan view of the agricultural machine applying a fluid to a target area which is near a sensitive area;

FIG. 3 is a block diagram of an embodiment of a system for predicting future wind direction and speed in order to better control wind-driven drift during the application of the fluid; and FIG. 4 is a flowchart of an embodiment of a computer-implemented method for predicting future wind direction and speed in order to better control wind-driven drift during the application of the fluid.

The figures are not intended to limit the present invention to the specific embodiments they depict. The drawings are not necessarily to scale.

DETAILED DESCRIPTION

The following detailed description of embodiments of the invention references the accompanying figures. The embodiments are intended to describe aspects of the invention in sufficient detail to enable those with ordinary skill in the art to practice the invention. Other embodiments may be utilized and changes may be made without departing from the scope of the claims. The following description is, therefore, not limiting. The scope of the present invention is defined only by the appended claims, along with the full scope of equivalents to which such claims are entitled.

In this description, references to "one embodiment", "an embodiment", or "embodiments" mean that the feature or features referred to are included in at least one embodiment of the invention. Separate references to "one embodiment", "an embodiment", or "embodiments" in this description do not necessarily refer to the same embodiment and are not mutually exclusive unless so stated. Specifically, a feature, structure, act, etc. described in one embodiment may also be included in other embodiments, but is not necessarily included. Thus, particular configurations of the present invention can include a variety of combinations and/or integrations of the embodiments described herein.

Broadly characterized, embodiments of the present invention provide a system and computer-implemented method for predicting a future wind direction and speed, based thereon, determining a future wind-driven drift near an agricultural machine and providing this information to an operator and/or automatically acting to adapt application parameters to better control the wind-driven drift of a fluid during application of the fluid to land and/or crops by an agricultural machine. Broadly, a processing element may receive machine and meteorological data, use a model to predict the future wind direction and speed, and access a drift distance determination mechanism to determine the future wind-driven drift of the fluid. The determined drift may be displayed for consideration by an operator of the machine. A sensitive area database may store information about sensitive areas bordering the target area, which may also be displayed, to facilitate proactively controlling the wind-driven drift with regard to the sensitive areas. Either or both databases may take the form of a list, table, or look-up table, and the drift database may be supplemented or replaced with a mathematical formula or algorithm for estimating drift. The mathematical model may be a kernel filter, an autoregressive model, an autoregressive integrated moving average model, or a hybrid model which incorporates features of different models. Thus, embodiments advantageously allow for creating and adaptively maintaining buffer zones in order to minimize the risk of drift into non-target areas, especially sensitive areas.

Referring to FIGS. 1 and 2, an exemplary operational environment for embodiments of the present invention may broadly comprise an agricultural sprayer or other machine 10 having a boom 12 and an operator cab 14, and being configured to apply a fluid to a target area 16. The target area 16 may border or be otherwise near a sensitive area 18, and it may be desirable to minimize exposure of the sensitive area 18 to the fluid. Due to meteorological conditions, particularly a prevailing wind 20 having a direction and a speed, the fluid may be subject to drifting in a drift direction 22 and to a drift distance 24, and so it may be desirable to identify and proactively control for such drift.

Referring also to FIG. 3, a system 30 which may be incorporated into, added onto, or otherwise made a part of the agricultural machine 10 is shown constructed in accordance with an embodiment of the present invention. The system 30 may broadly comprise a tank or other reservoir 32 containing a fluid 34, a pump 36, pressure plumbing 38, a plurality of delivery lines 40, a plurality of nozzles 42, one or more machine sensors including a fluid pressure sensor 44, one or more meteorological sensors 46, and a control system for predicting future wind direction and speed and future drift and providing this information to an operator and/or substantially automatically taking action to proactively adapt one or more application parameters to better control wind-driven drift during the application of fluids to land and/or crops by the sprayer machine 10. The control system may broadly include an electronic processing element 48, a drift distance determination mechanism 50, a sensitive area database 52, and an operator display 54.

The tank 32 may be configured to contain the fluid 34 to be applied, and the pump 36 may be configured to transfer the fluid 34 from the tank 32 to the pressure plumbing 38 and to develop a base fluid pressure. The pressure plumbing 38 may be configured to distribute the fluid 34 to the delivery lines 40. The plurality of delivery lines 40 may be arranged along the boom 12 of the sprayer machine 10, and configured to distribute the fluid 34 over the target area to which the fluid 34 is to be applied. The plurality of nozzles 42 may be connected to the delivery lines 40 and configured to meter, atomize, and deliver the fluid 34 to the target area. The fluid pressure sensor 44 may be configured to measure a fluid pressure of the fluid 34 in the pressure plumbing 38. The one or more meteorological sensors 46 may be configured to provide meteorological data, such as wind direction, wind speed, relative humidity, and/or temperature. Some or all of the meteorological sensors 46 may be provided in the form of a weather station. In one implementation, the meteorological sensors 46 may be physically mounted on the agricultural machine 10, while in another implementation, the meteorological sensors 46 may be functionally associated and in communication with the machine 10 but physically separate or even mounted on another nearby machine or structure. In various implementations, for example, one or more meteorological sensors may be mounted on fixed, mobile, or moving structures or even vehicles, such as on fixed posts or movable tripods spaced around or in the target area or on drones positioned or moving around or through the target area.

The electronic processing element 48 may be substantially any suitable processor, such as a processor found in a computer, configured to execute instructions for performing at least some of the data processing and/or other actions associated with the computer-implemented method 110 shown in FIG. 4 and discussed below, including using a mathematical model to predict a future wind direction and a future wind speed. Potential models are discussed in detail below. The drift distance determination mechanism 50 may be a database configured to store drift distances for different application parameters, such as droplet size and/or meteorological conditions. This information may be correlated and stored in the form of a look-up table. Additionally or alternatively, the drift distance determination mechanism 50 may be supplemented or replaced with a mathematical formula or algorithm for estimating drift distances from a model. The sensitive area database 52 may be configured to store geographic and/or other information regarding designated sensitive areas. The operator display 54 may be located in the operator cab 14 of the machine 10, and may be configured to at least visually communicate the results of the data processing performed by the processing element 48 for consideration by an operator of the machine 10. Additionally or alternatively, the processing element 48 may be configured to proactively substantially automatically take action to control the wind-driven drift. Further, the results of the data processing performed by the processing element 48 may be communicated via a wireless communications network to one or more remote electronic devices (e.g., computers and/or smartphones) for storage and/or consideration by remotely located personnel.

Figure 4:
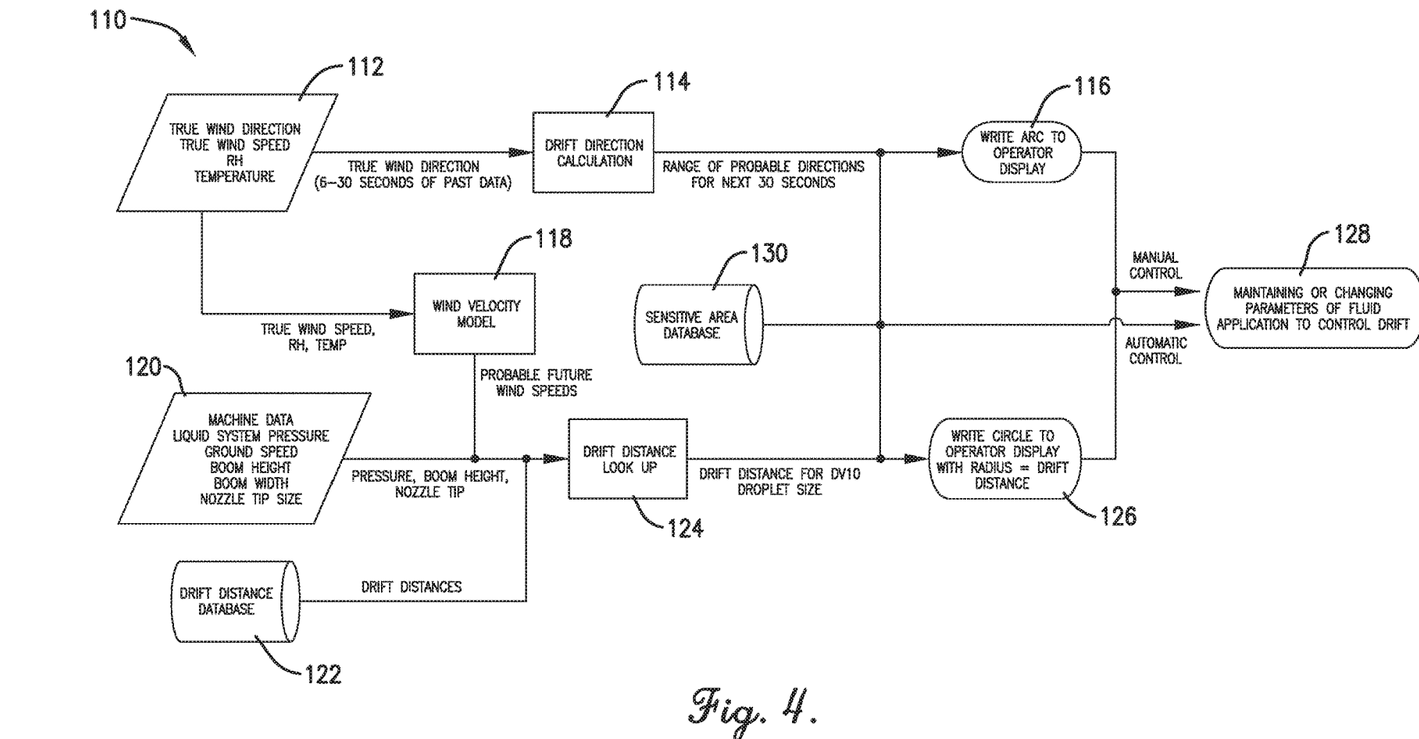

Referring also to FIG. 4, the functionality of the system 10, particularly the processing element 48, may be expressed as a computer-implemented method 110 shown practiced in accordance with an embodiment of the present invention. As such, the computer-implemented method may be characterized as improving the functioning of the computer containing the processing element 48 and, more generally, of the machine 10. In one implementation, at least some of the steps of the method 110 may be performed by the processing element 48 without substantial human interaction (beyond the minor interactions of, e.g., initiating a step, providing a value used by a step, etc.).

Figure 1:
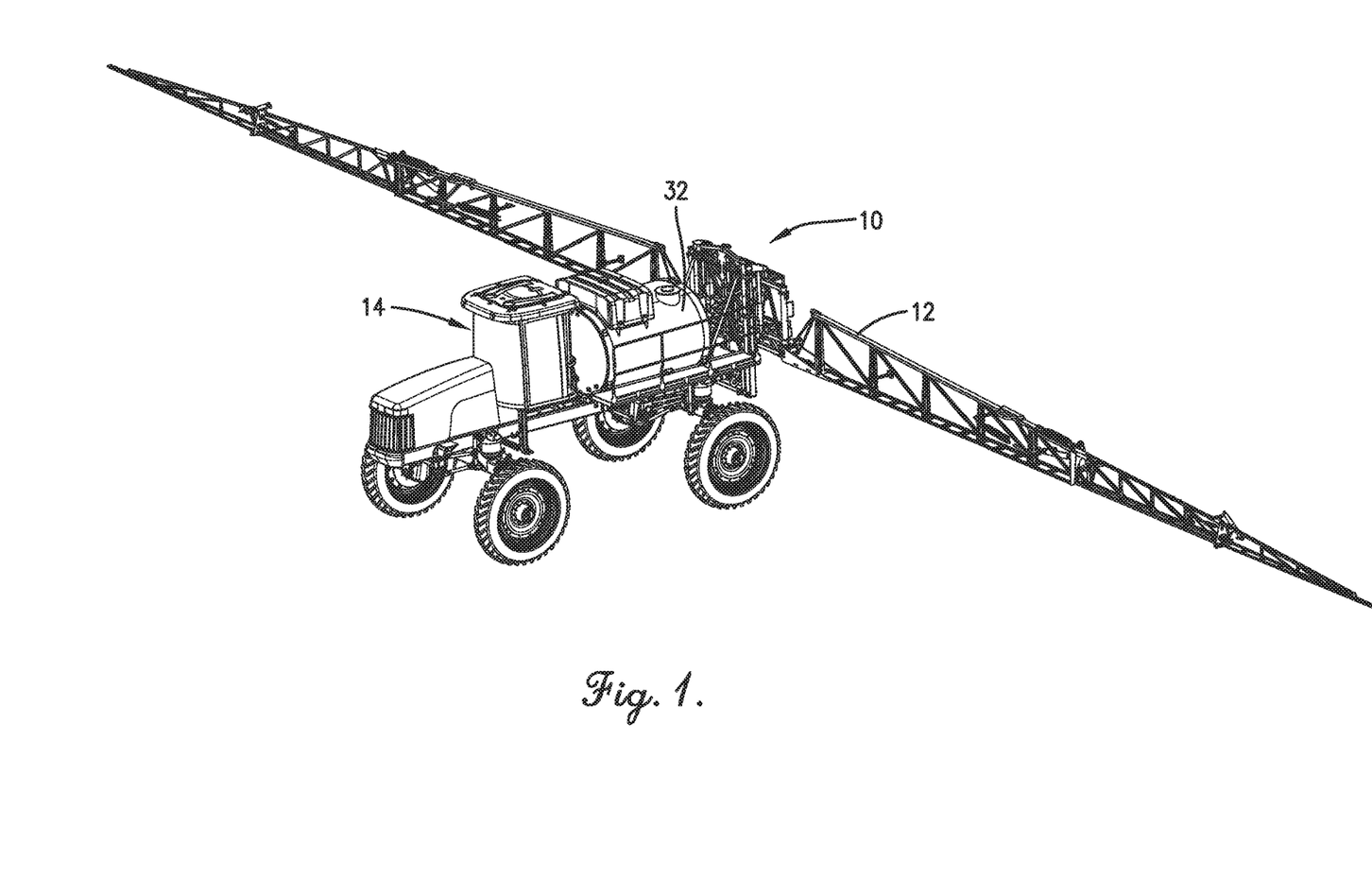
Figure 2:
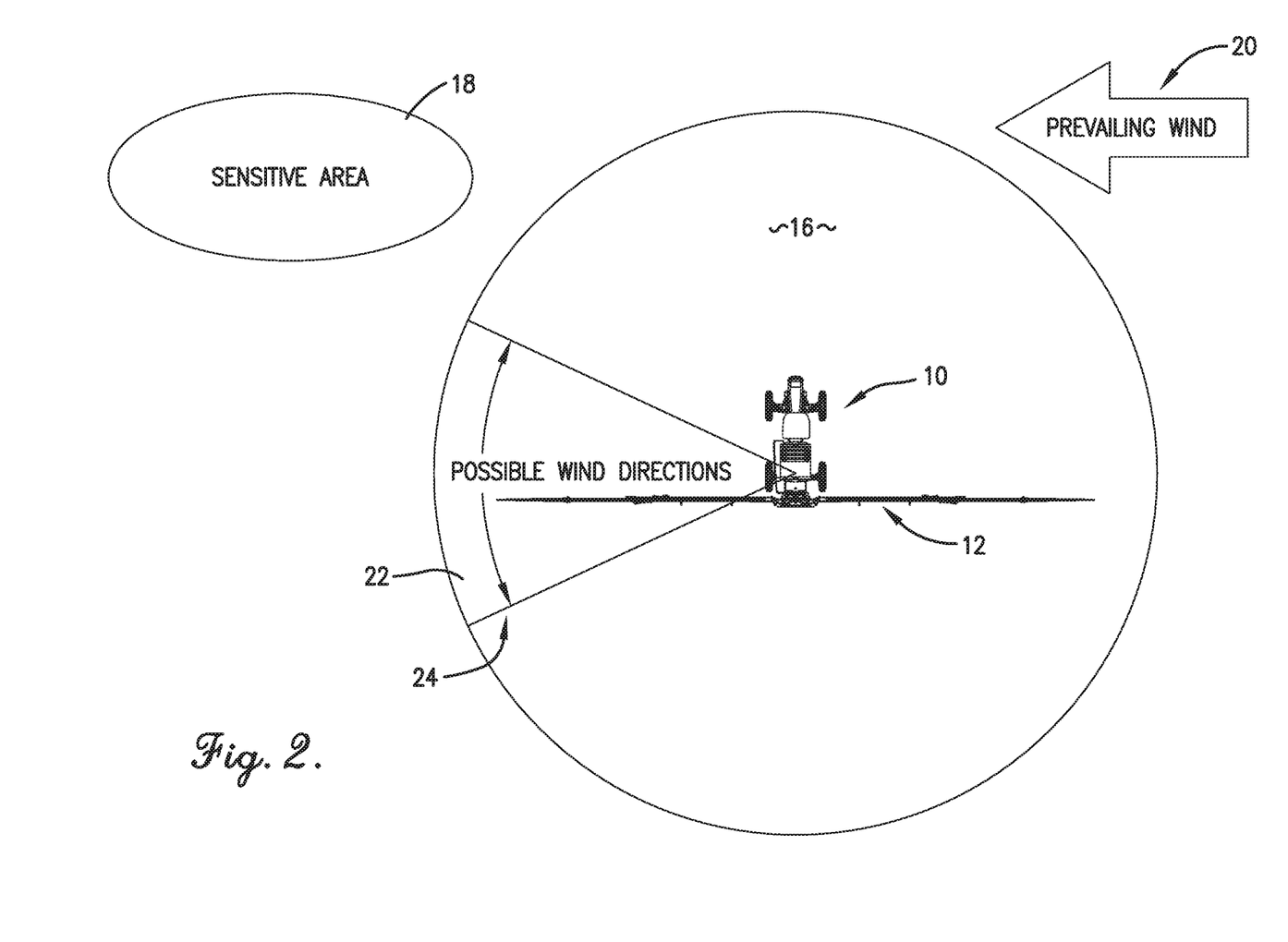
Figure 3:
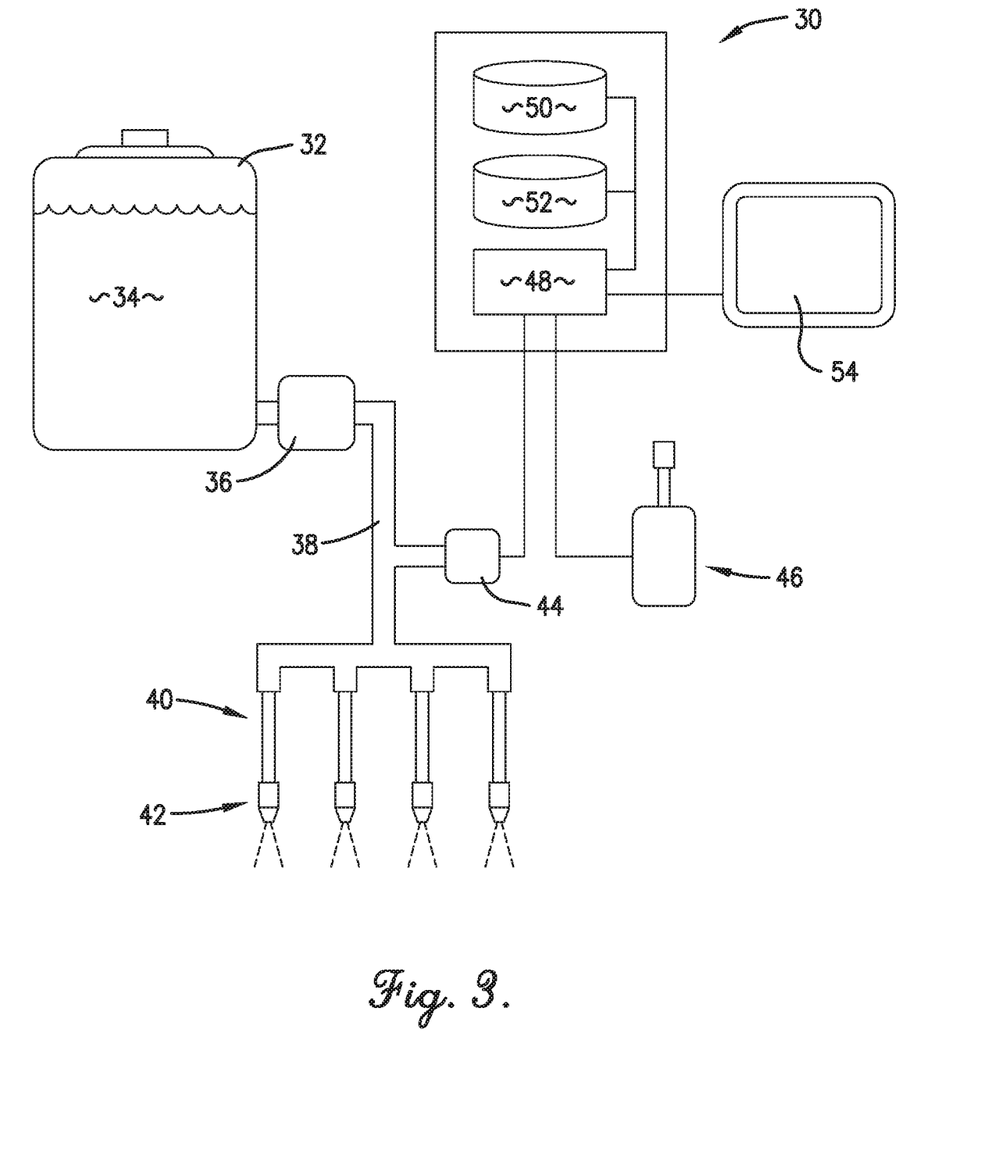

Meteorological data may be collected by the one or more meteorological sensors 46, some or all of which may be part of the weather station, as shown in 112. The meteorological data may include such factors as current wind direction, current wind speed, current relative humidity, and/or current temperature. At least the wind direction data for the previous approximately between 1 and 60 seconds, or the previous approximately between 1 and 30 seconds, may be used by the processing element 48 as input to the mathematical model in order to predict the probable direction (or a range thereof), at least approximately between ground level and 5 to 10 meters above ground level, for the next approximately between 5 and 60 seconds, or the next approximately between 5 and 30 seconds, as shown in 114. The probable drift direction (or the range thereof) may then be visually depicted on the operator display 54, such as by an arc extending outwardly from the machine's location (seen in FIG. 2), for consideration by the operator, as shown in 116. Based on this, the operator may take appropriate action to maintain or proactively adapt one or more of the application parameters (e.g., droplet size) to control the drift, as shown in 128. For example, droplet size may be adapted by changing the pressure of the fluid, the size of the nozzle orifice, the type of the nozzle, and/or by adding a drift adjuvant.

At least the wind speed data, and possibly the relative humidity and temperature data, for the previous approximately between 1 and 60 seconds, or the previous approximately between 1 and 30 seconds, may be used by the processing element as input to the mathematical model in order to predict the probable wind velocity (or a range thereof), at least approximately between ground level and 5 to 10 meters above ground level, for the next approximately between 5 and 60 seconds, or the next approximately between 5 and 30 seconds, as shown in 118. Machine data may be collected by the one or more machine sensors such as the fluid pressure sensor 44, as shown in 120. The machine data may include such factors as fluid pressure, ground speed, boom height, boom width, and droplet size. The processing element 48 may access the drift distance database 50, as shown in 122. The processing element 48 may use the predicted future wind direction and speed, and possibly other meteorological data (such as the relative humidity and temperature data), and the machine data, and consult the drift distance database 50 to determine a predicted future wind-driven drift the given fluid pressure, droplet size, and/or other application parameters, as shown in 124. The predicted future wind-driven drift may then be visually depicted on the operator display 54 for consideration by the operator, as shown in 126. Based on this, the operator may take appropriate action to maintain or proactively adapt one or more of the application parameters (e.g., droplet size) to control drift, as shown in 128.

With regard to the visual depictions of the drift direction 20 and drift distance 22 on the operator display 54, data from each droplet size (e.g., fine, medium, coarse) may be represented with different colors (e.g., red, yellow, and blue, respectively) and/or other distinguishing characteristics. Each color may represent the boundary at which a specified amount (e.g., approximately between 80% and 100%, or approximately 90%) of the spray volume is likely to travel given the current meteorological conditions. The specified amount may be settable by the operator to reflect an amount of risk the operator is willing to assume.

Additionally, based on the determined future wind-driven drift, the processing element 48 may be configured to substantially automatically (with no more than minor involvement (e.g., affirmative approval) of the operator) take appropriate action to maintain or proactively adapt one or more of the application parameters (e.g., droplet size) to control drift, as shown 128. This may involve accessing the second sensitive area database 52, as shown in 130, in order to determine how to control drift so as to protect a particular sensitive area. Such automatic action by the processing element action 48 may supplement or replace manual action by the operator.

Potential factors in predicting changes in the direction and speed of the wind may include the current wind speed (low wind speeds may be associated with increased likelihood of large wind changes); time of day (later times may be associated with increased likelihood of large wind changes); solar radiation levels (higher levels may be associated with increased likelihood of large wind changes); and/or topography of the land, size of droplets, pressure at nozzles, and/or height and angle of nozzles.

With regard to predicting future wind direction and speed, at least approximately between ground level and 5 to 10 meters above ground level, embodiments of the present invention may use any suitable mathematical model, such as a kernel filter (which is typically used for predicting wind speeds for wind turbines), an autoregressive (AR) model, an autoregressive integrated moving average (ARIMA) model, or a hybrid model. The hybrid model may include aspects of median filtering, Taylor series expansion, and ARIMA. During testing, all four models achieved RMS errors lower than a non-model, with the AR model yielding the lowest RMS error, and the ARIMA model reducing the number of times predictions varied from actual values by more than 20 degrees. The hybrid model yielded the most "friendly" results because it needs no information regarding average wind speed.

For the kernel filter, the predicted value may be calculated by fitting a probability of existing values that is dependent on past observed values. As the process is carried out, the current observations may be compared to past values to determine how different are these observations. A weight may then be calculated that depends on this difference in observed values. Finally, to calculate the variable that is being predicted, past values may be summed with corresponding weights. This sum may be divided by the sum of the weights. This process is known as the Nadaraya-Watson kernel-weighted average. The kernel filter model may be expressed as follows:

$$\hat{Y}(x_0) = \frac{\sum_{i=1}^{N}(K_\lambda(x_0, x_i)y_i)}{\sum_{i=1}^{N}(K_\lambda(x_0, x_i))}$$

$$K_\lambda(x_0, x_i) = D\left(\frac{|x - x_0|}{\lambda}\right)$$

$$D(t) = \begin{cases} \frac{3}{4}(1 - t^{\wedge}2), & \text{if } |t| \le 1 \\ 0, & \text{otherwise} \end{cases}$$

wherein, $\hat{Y}(x_0)$ is the new predicted value based on the ($x_0$) observations;

$y_i$ is the past observed target values that $\hat{Y}$ tries to predict; the summation goes over N past observations for all inputs $x_i$ with the observed target value $y_i$; and $K_\lambda(x_0, x_i)$ is the kernel being used with constant $\lambda$ and weighting function D.

Past wind speed, wind direction, solar radiation, changes in wind direction, and changes in wind speed may be given their own lambda. The lambda values may be changed to find the minimum RMS error to optimize the model's predictive behavior. The minimum RMS error equation may be expressed as follows:

$$RMS_{error} = \sqrt{\frac{\sum_{i=1}^{N} Error_{Wd}^2}{N}}$$

wherein, $Error_{Wd} = W_{d_p} - W_{d_a}$;

$W_{d_p}$ is the predicted wind direction; and $W_{d_a}$ is the actual wind direction.

For the AR model, the last 30 second of data may be used to predict the next value. The AR model may be expressed as follows:

$$\hat{Y}_{n+30} = a_0 Y_n + a_1 Y_{n-1} + \ldots + a_N Y_{n-N} + a_{N+1}$$

wherein, $Y_n$ is the observed wind direction at time n;

$a_0, a_1, \ldots, a_{N+1}$ are constants used to weight the observations; and

N=30.

The constants may be optimized to reduce the RMS error.

For the ARIMA model, the AR model is expanded. The ARIMA model may be expressed as follows:

$$(1 - \Sigma_{k=1}^{p} \phi_k L^k)(1-L)^d Y_t = \delta + (1 - \Sigma_{k=1}^{q} \theta_k L^k) \in_t$$

wherein, $Y_t$ is the next observed value;

$\delta$ is a drift constant;

$\phi_k$ is an autoregressive constant that acts on the observed value $Y_{t-k}$;

$\theta_k$ is a moving average constant that acts on $\in_t$;

$L^k$ is a lag operator, i.e., $L^k Y_t = Y_{t-k}$;

$\in_t$ is the error of the prediction value and the observed value and is distributed with mean zero and standard deviation of $\sigma$;

p and q are the number of autoregressive and moving average terms (p=q=40); and d is the number of times the difference of the data is taken (d=0).

The first 30 constants for the autoregressive and the moving average terms may be taken to be zero. As a result, the next value may be the prediction of wind direction 30 second into the future. The error may not be minimized to find the constant $\phi_k$ and $\theta_k$, but the log-likelihood function may be maximized.

The hybrid model is the most general model because the constants do not depend on an average wind direction. The hybrid model may be expressed as follows:

$$\hat{Y}_{n+30} = W_1^{a1} W_2^{a2} W_3^{a3}$$

wherein, $$W_1 = a_4 Y_n + a_5 Y_{n-1} + \ldots + a_{10} Y_{n-6} + a_{11} X_n$$

$$W_2 = Y_n + a_{12}(Y_n - Y_{n-1}) + a_{13}(2Y_{n-1} - Y_n - Y_{n-2}) + a_{14}(Y_n - Y_{n-3}) + 3(Y_{n-2} - Y_{n-1})$$

$$W_3 = a_{15} \text{median}(Y_n : Y_{n-30})$$

The equation for $W_1$ takes the form of an ARIMAX model using the autoregressive terms of the standard ARIMA model with the addition of an X term:

$$X_n = \frac{Ws_n - Ws_{n-1}}{\text{mean}(Ws_n : Ws_{n-30})}$$

wherein,
$Ws_n$ is the wind speed at time n; and
the mean is taken from time n to time n−30.

The equation for $W_2$ contains the first three terms of a Taylor series expansion utilizing numerical backward differences to estimate first, second, and third derivatives with differing constants to better estimate the future wind direction. The equation for $W_3$ is a median filtering function over the past 30 seconds with an arbitrary constant. The constants may be found by minimizing the RMS error using quasi-newton unconstrained minimization.

Using one or more of the mathematical models set forth herein, future wind speed and direction may be predicted in the immediate vicinity of the sprayer or other machine 10. The immediate vicinity of the machine 10 may be an area that is between ground level and 5 to 10 meters above ground level, and within 5 to 10 meters of a center of the machine 10.

Although the invention has been described with reference to the one or more embodiments illustrated in the figures, it is understood that equivalents may be employed and substitutions made herein without departing from the scope of the invention as recited in the claims.

Having thus described one or more embodiments of the invention, what is claimed as new and desired to be protected by Letters Patent includes the following:

1. An agricultural machine comprising:
    a reservoir configured to contain a fluid;
    a pump configured to transfer the fluid out of the reservoir;
    a plurality of delivery lines arranged along a boom of the agricultural machine and configured to receive and distribute the fluid;
    a plurality of nozzles connected to the plurality of delivery lines and configured to meter, atomize, and apply the fluid to a target area;
    one or more machine sensors configured to provide machine data about one or more application parameters including a fluid pressure data;
    one or more meteorological sensors associated with the target area and configured to provide meteorological data including a current wind direction data and a current wind speed data; and
    a control system for improving controlling a wind-driven drift of the fluid during application of the fluid to the target area by the agricultural machine, the control system including—
        a drift distance determination mechanism configured to determine a plurality of drift distances correlated with a plurality of different application parameters,
        an electronic processing element configured to—
            receive the machine data and the meteorological data,
            use a mathematical model to predict a future wind direction and a future wind speed for at least a next approximately between 5 seconds and 30 seconds, wherein predicting the future wind direction and the future wind speed is not based upon evaluating a distance between the one or more meteorological sensors and the plurality of delivery lines,
            access the drift distance determination mechanism, and
            based on the machine data, the predicted future wind direction and the predicted future wind speed, and the correlated drift distances from the drift distance determination mechanism, determine a future wind-driven drift of the fluid, and
        an operator display configured to visually depict the determined future wind-driven drift of the fluid to facilitate controlling the wind-driven drift of the fluid.

2. The agricultural machine as set forth in claim 1, wherein the one or more application parameters further include a ground speed of the agricultural machine, a boom height of the boom, a boom width of the boom, and a droplet size of the fluid delivered by the plurality of nozzles.

3. The agricultural machine as set forth in claim 1, wherein the one or more meteorological sensors are mounted on the agricultural machine.

4. The agricultural machine as set forth in claim 1, wherein the meteorological data further includes relative humidity data and temperature data.

5. The agricultural machine as set forth in claim 1, wherein the drift distance determination mechanism is a database containing the plurality of drift distances correlated with the plurality of different application parameters.

6. The agricultural machine as set forth in claim 1, wherein the electronic processing element is configured to collect the current wind direction data and the current wind speed data for approximately between 1 second and 30 seconds.

7. The agricultural machine as set forth in claim 1, wherein the electronic processing element is configured to predict the future wind direction and the future wind speed for a next between approximately 5 seconds and 60 seconds.

8. The agricultural machine as set forth in claim 1, wherein the electronic processing element is configured to predict a range of future wind directions, and the operator display is configured to visually depict the range of future wind directions as an arc centered on the agricultural machine.

9. The agricultural machine as set forth in claim 8, wherein the electronic processing element is configured to predict a range of future wind directions for each of two or more droplet sizes of the fluid delivered by the plurality of nozzles, and the operator display is configured to visually depict a particular range of future wind directions for each of the two or more droplet sizes as a differently colored arc centered on the agricultural machine.

10. The agricultural machine as set forth in claim 1, wherein the mathematical model used to predict the future wind direction and the future wind speed is selected from the group consisting of: kernel filters, autoregressive models, autoregressive integrated moving average models, and hybrid models which incorporate features of two or more different mathematical models.

11. The agricultural machine as set forth in claim 1, further including a sensitive area database containing information about one or more sensitive areas bordering the target area, and the operator display is configured to visually depict a nearby sensitive area along with the determined future wind-driven drift of the fluid in order to facilitate controlling the wind-driven drift of the fluid to avoid the nearby sensitive area.

12. The agricultural machine as set forth in claim 1, wherein the electronic processing element is configured to automatically adapt the one or more application parameters to automatically control the wind-driven drift of the fluid.

13. An agricultural machine comprising:
a reservoir configured to contain a fluid;
a pump configured to transfer the fluid out of the reservoir;
a plurality of delivery lines arranged along a boom of the agricultural machine and configured to receive and distribute the fluid;
a plurality of nozzles connected to the plurality of delivery lines and configured to meter, atomize, and deliver the fluid to a target area;
one or more machine sensors configured to provide machine data about one or more application parameters including a fluid pressure data;
one or more meteorological sensors mounted on the agricultural machine and configured to provide meteorological data including a current wind direction at the agricultural machine data and a current wind speed at the agricultural machine data; and
a control system for improving controlling a wind-driven drift of the fluid during application of the fluid to the target area by the agricultural machine, the control system including—
a drift distance database containing a plurality of drift distances correlated with a plurality of different application parameters,
an electronic processing element configured to—
receive the machine data and the meteorological data,
use a mathematical model to predict a future wind direction and a future wind speed for at least a next approximately between 5 seconds and 30 seconds, wherein predicting the future wind direction and the future wind speed is not based upon evaluating a distance between the one or more meteorological sensors and the plurality of delivery lines,
access the drift distance database, and
based on the machine data, the predicted future wind direction and the predicted future wind speed, and the correlated drift distances in the drift distance database, determine a future wind-driven drift of the fluid, and
based on the determined future wind-driven drift, automatically adapt the one or more application parameters to automatically control the wind-driven drift of the fluid.

14. The agricultural machine as set forth in claim 13, wherein the one or more application parameters further include a ground speed of the agricultural machine, a boom height of the boom, a boom width of the boom, and a droplet size of the fluid delivered by the plurality of nozzles.

15. The agricultural machine as set forth in claim 13, wherein the meteorological data further includes relative humidity data and temperature data.

16. The agricultural machine as set forth in claim 13, wherein the electronic processing element is configured to collect the current wind direction at the agricultural machine data and the current wind speed at the agricultural machine data for approximately between 1 seconds and 30 seconds.

17. The agricultural machine as set forth in claim 13, wherein the electronic processing element is configured to predict the future wind direction and the future wind speed for a next between approximately 5 seconds and 60 seconds.

18. The agricultural machine as set forth in claim 13, wherein the mathematical model used to predict the future wind direction and the future wind speed is selected from the group consisting of: kernel filters, autoregressive models, autoregressive integrated moving average models, and hybrid models which incorporate features of two or more different mathematical models.

19. The agricultural machine as set forth in claim 13, further including a sensitive area database containing information about one or more sensitive areas bordering the target area, and the operator display is configured to visually depict a nearby sensitive area along with the determined future wind-driven drift of the fluid in order to facilitate controlling the wind-driven drift of the fluid to avoid the nearby sensitive area.

20. A computer-implemented method for improving the functionality of a computer on an agricultural machine for facilitating controlling a wind-driven drift of a fluid during an application of the fluid by the agricultural machine, the computer-implemented method comprising:
receiving, by an electronic processing element, machine data from one or more machine sensors configured to provide machine data about one or more application parameters including a fluid pressure data;
receiving, by the electronic processing element, meteorological data from one or more meteorological sensors configured to provide meteorological data including a current wind direction and a current wind speed;
using, by the electronic processing element, a mathematical model to predict a future wind direction and a future wind speed near the agricultural machine for at least a next approximately between 5 seconds and 30 seconds, wherein predicting the future wind direction and the future wind speed is not based upon evaluating a distance between the one or more meteorological sensors and the plurality of delivery lines;
accessing, by the electronic processing element, a drift distance database containing a plurality of drift distances correlated with a plurality of different application parameters; and
determining, by the electronic processing element, a future wind-driven drift of the fluid based on the machine data, the predicted future wind direction and the predicted future wind speed, and the correlated drift distances in the drift distance database.

21. The computer-implemented method as set forth in claim 20, wherein the one or more application parameters further include a ground speed of the agricultural machine, a boom height of a boom component of the agricultural machine, a boom width of the boom component, and a droplet size of the fluid delivered by the plurality of nozzles.

22. The computer-implemented method as set forth in claim 20, wherein the meteorological data further includes relative humidity data and temperature data.

23. The computer-implemented method as set forth in claim 20, wherein the electronic processing element is configured to collect the current wind direction data and the current wind speed data for approximately between 1 seconds and 30 seconds.

24. The computer-implemented method as set forth in claim 20, wherein the electronic processing element is configured to predict the future wind direction and the future wind speed for a next approximately between 5 seconds and 60 seconds.

25. The computer-implemented method as set forth in claim 20, wherein the electronic processing element is configured to predict a range of future wind directions.

26. The computer-implemented method as set forth in claim 25, wherein the electronic processing element is configured to predict a range of future wind directions for each of two or more droplet sizes of the fluid delivered by a plurality of nozzles arranged along a boom component of the agricultural machine.

27. The computer-implemented method as set forth in claim 20, wherein the mathematical model used to predict the future wind direction and the future wind speed is selected from the group consisting of: kernel filters, autoregressive models, autoregressive integrated moving average models, and hybrid models which incorporate features of two or more different mathematical models.

* * * * *